United States Patent
Yamada

(10) Patent No.: US 9,571,697 B2
(45) Date of Patent: Feb. 14, 2017

(54) IMAGE PROCESSING DEVICE SETTING SHARPNESS ADJUSTMENT DEGREES FOR OBJECT REGIONS AND PERFORMING UNSHARP MASKING PROCESS

(71) Applicant: BROTHER KOGYO KABUSHIKI KAISHA, Nagoya, Aichi (JP)

(72) Inventor: Ryuji Yamada, Ogaki (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 14/918,645

(22) Filed: Oct. 21, 2015

(65) Prior Publication Data

US 2016/0119503 A1 Apr. 28, 2016

(30) Foreign Application Priority Data

Oct. 28, 2014 (JP) ................. 2014-219307

(51) Int. Cl.
| | |
|---|---|
| H04N 1/409 | (2006.01) |
| H04N 1/407 | (2006.01) |
| G06T 5/00 | (2006.01) |
| H04N 1/00 | (2006.01) |
| H04N 1/58 | (2006.01) |
| H04N 1/60 | (2006.01) |
| G06K 15/00 | (2006.01) |

(52) U.S. Cl.
CPC .............. *H04N 1/4092* (2013.01); *G06T 5/004* (2013.01); *H04N 1/00167* (2013.01); *H04N 1/58* (2013.01); *H04N 1/6072* (2013.01); *G06T 2207/10004* (2013.01); *G06T 2207/10024* (2013.01); *G06T 2207/20012* (2013.01); *G06T 2207/30176* (2013.01)

(58) Field of Classification Search
CPC .... H04N 1/4092; H04N 1/00167; H04N 1/58; H04N 1/6072; G06T 5/004
USPC ....... 358/3.27, 1.9, 3.26; 382/266, 275, 261, 382/263
See application file for complete search history.

(56) References Cited

U.S. PATENT DOCUMENTS

| | | | |
|---|---|---|---|
| 6,351,558 B1 | 2/2002 | Kuwata | |
| 2005/0089247 A1* | 4/2005 | Braun | G06K 9/40 382/298 |
| 2006/0092474 A1* | 5/2006 | Ramsay | G06T 5/00 358/3.27 |

FOREIGN PATENT DOCUMENTS

| | | |
|---|---|---|
| JP | H10-200778 A | 7/1998 |
| JP | 2000-285231 A | 10/2000 |
| JP | 2010-004300 A | 1/2010 |

* cited by examiner

*Primary Examiner* — Quang N Vo
(74) *Attorney, Agent, or Firm* — Scully, Scott, Murphy & Presser, P.C.

(57) ABSTRACT

An image processing device includes a processor. The processor is configured to perform: acquiring input image data representing an input image having a plurality of objects; identifying a plurality of object regions in the input image, the plurality of object regions representing respectively the plurality of objects; generating a mask image using sharpness adjustment degrees that are set for the plurality of object regions respectively; generating output image data by performing an unsharp masking process on the input image by using the mask image, the unsharp masking process being performed so as to adjust sharpness of the input image; and sending the output image data to a printing unit.

15 Claims, 9 Drawing Sheets

S272: ANALYZE IMAGE IN TARGET OBJECT AREA AND DIVIDE TARGET OBJECT AREA INTO PROCESS PARTS OF FIRST AND SECOND TYPES

S274: GENERATE PARTIAL MASK DATA FOR PROCESS PART OF FIRST TYPE AT FIRST SMOOTHING STRENGTH

S276: GENERATE PARTIAL MASK DATA FOR PROCESS PART OF SECOND TYPE WITHOUT SMOOTHING IMAGE (OR GENERATE PARTIAL MASK DATA FOR PROCESS PART OF SECOND TYPE AT SECOND SMOOTHING STRENGTH)

→ S278

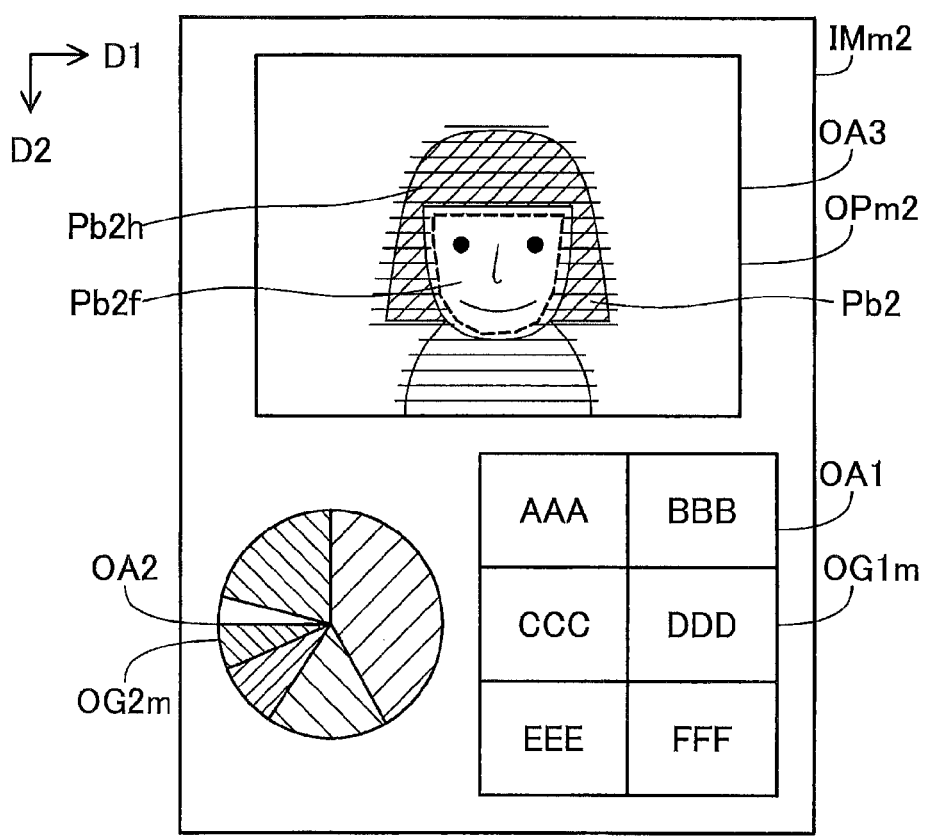

FIG. 10

IMAGE PROCESSING DEVICE SETTING SHARPNESS ADJUSTMENT DEGREES FOR OBJECT REGIONS AND PERFORMING UNSHARP MASKING PROCESS

CROSS REFERENCE TO RELATED APPLICATION

This application claims priority from Japanese Patent Application No. 2014-219307 filed Oct. 28, 2014. The entire content of the priority application is incorporated herein by reference.

TECHNICAL FIELD

The present disclosure relates to an image process for processing an image to be printed.

BACKGROUND

Various types of image processes to improve the quality of printed images are disclosed in, for example, Japanese Patent Application Publication No. 2000-285231 and Japanese Patent Application Publication No. 2010-4300. In these processes, techniques have been proposed for creating an unsharped mask that is less blurry than an original image. The image-sharpening process is performed to sharpen images using the unsharped mask.

SUMMARY

Printed images often include a plurality of types of objects. However, the conventional techniques described above make no mention of performing an image process on different types of objects. Thus, when performing an image process on an image that includes a plurality of types of objects, the image process may have the effect of improving the quality of some of the objects while worsening the quality of others.

In order to attain the above and other objects, the disclosure provides an image processing device. The image processing device includes a processor. The processor is configured to perform: acquiring input image data representing an input image having a plurality of objects; identifying a plurality of object regions in the input image, the plurality of object regions representing respectively the plurality of objects; generating a mask image using sharpness adjustment degrees that are set for the plurality of object regions respectively; generating output image data by performing an unsharp masking process on the input image by using the mask image, the unsharp masking process being performed so as to adjust sharpness of the input image; and sending the output image data to a printing unit.

According to another aspects, the disclosure provides a non-transitory computer readable storage medium storing a set of program instructions installed on and executed by a computer. The program instructions includes: acquiring input image data representing an input image having a plurality of objects; identifying a plurality of object regions in the input image, the plurality of object regions representing respectively the plurality of objects; generating a mask image using sharpness adjustment degrees that are set for the plurality of object regions respectively; generating output image data by performing an unsharp masking process on the input image by using the mask image, the unsharp masking process being performed so as to adjust sharpness of the input image; and sending the output image data to a printing unit.

BRIEF DESCRIPTION OF THE DRAWINGS

The particular features and advantages of the disclosure as well as other objects will become apparent from the following description taken in connection with the accompanying drawings, in which:

FIG. 9 is a portion of a flowchart for a mask generating process according to a second embodiment;

FIG. 10 is an explanatory diagram illustrating an example of a complete mask generated in the mask generating process according to the second embodiment.

DETAILED DESCRIPTION

A. First Embodiment

Figure 1:
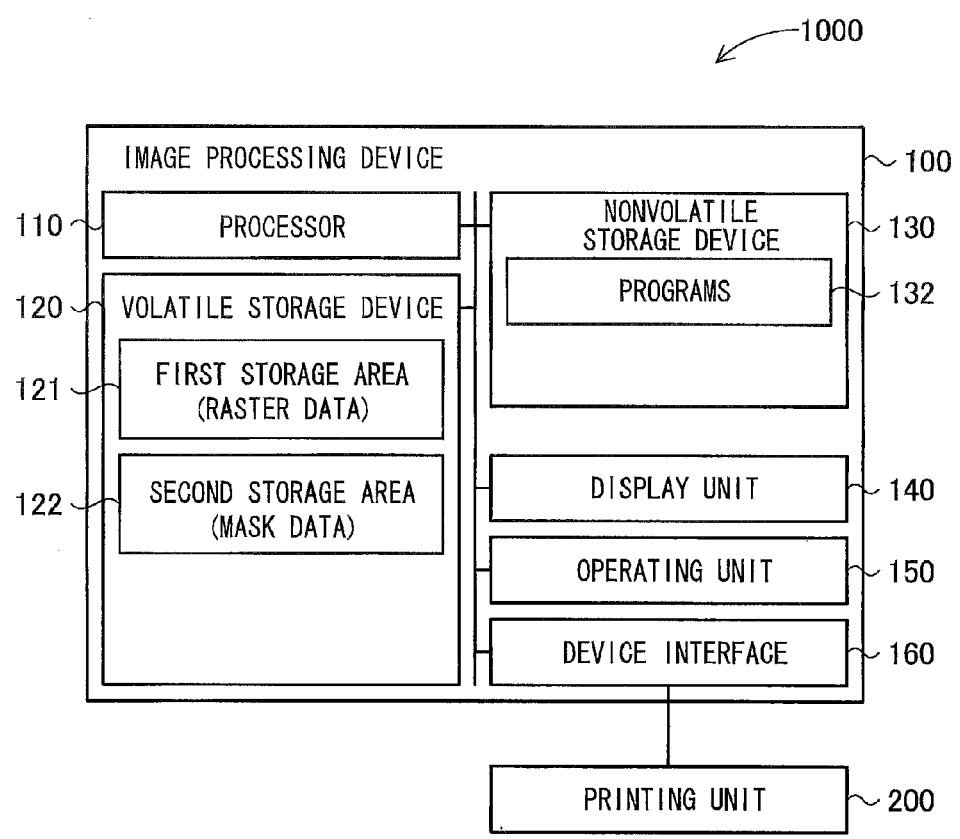
FIG. 1 is a block diagram showing an image-processing system according to a first embodiment.

FIG. 1 is a block diagram showing an image-processing system 1000 according to a first embodiment. The image-processing system 1000 has an image processing device 100, and a printing unit 200 connected to the image processing device 100.

The image processing device 100 is a personal computer, for example. The image processing device 100 includes a processor 110, a volatile storage device 120, a nonvolatile storage device 130, a display unit 140, an operating unit 150, and a device interface 160.

The processor 110 is a device that performs data processing, such as a CPU. The volatile storage device 120 is configured of DRAM, for example. The nonvolatile storage device 130 is flash memory, for example. The nonvolatile storage device 130 stores programs 132. The processor 110 implements various functions described later in greater detail by executing the programs 132. The processor 110 temporarily stores various intermediate data used when executing programs (the program 132, for example) in a storage device, such as the volatile storage device 120 or the nonvolatile storage device 130.

The display unit 140 is a device that displays images, such as a liquid crystal display. The operating unit 150 is a device that receives operations inputted by the user, such as a touchscreen superimposed over the display unit 140. By operating the operating unit 150, the user can input various instructions into the image processing device 100, such as a start command for a printing process described later.

The device interface 160 is an interface capable of communicating with other devices, such as a USB interface, a wired LAN interface, or the IEEE 802.11 wireless interface. In the image-processing system 1000 of FIG. 1, the printing unit 200 is connected to the device interface 160.

The printing unit 200 functions to print images on paper (an example of the printing medium). In the embodiment, the printing unit 200 is an inkjet printing device that prints using ink in the colors cyan (C), magenta (M), yellow (Y), and black (K). However, the printing unit 200 may be another type of printing device, such as a laser printing device.

Figure 2:
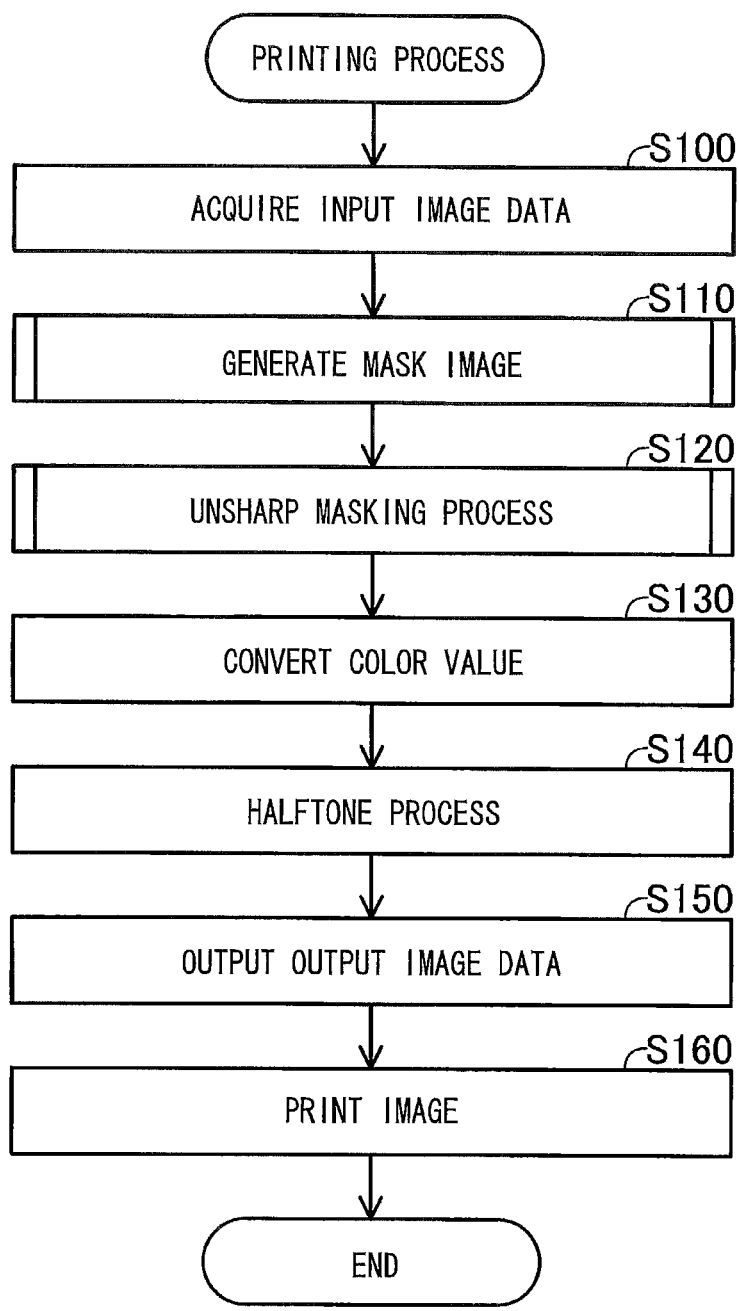
FIG. 2 is a flowchart illustrating steps in a printing process.

FIG. 2 is a flowchart showing steps in a printing process. The processor 110 begins executing this printing process when a user inputs a start command for the printing process via the operating unit 150 (see FIG. 1). For example, the user of the image processing device 100 may control the image processing device 100 to execute an image-processing application (not shown) that generates image data representing a text document, graphics, and the like. Next, the user inputs a print command via the image-processing application, and the processor 110 initiates the printing process in response to the print command. The processor 110 controls the printing process in accordance with the program 132. In the following description, the notation used to specify each step of the process will include the character "S", followed by a number.

In S100 of FIG. 2, the processor 110 acquires input image data as the printing target. For example, the input image data acquired by the processor 110 is image data generated by the image-processing application.

Figure 3:
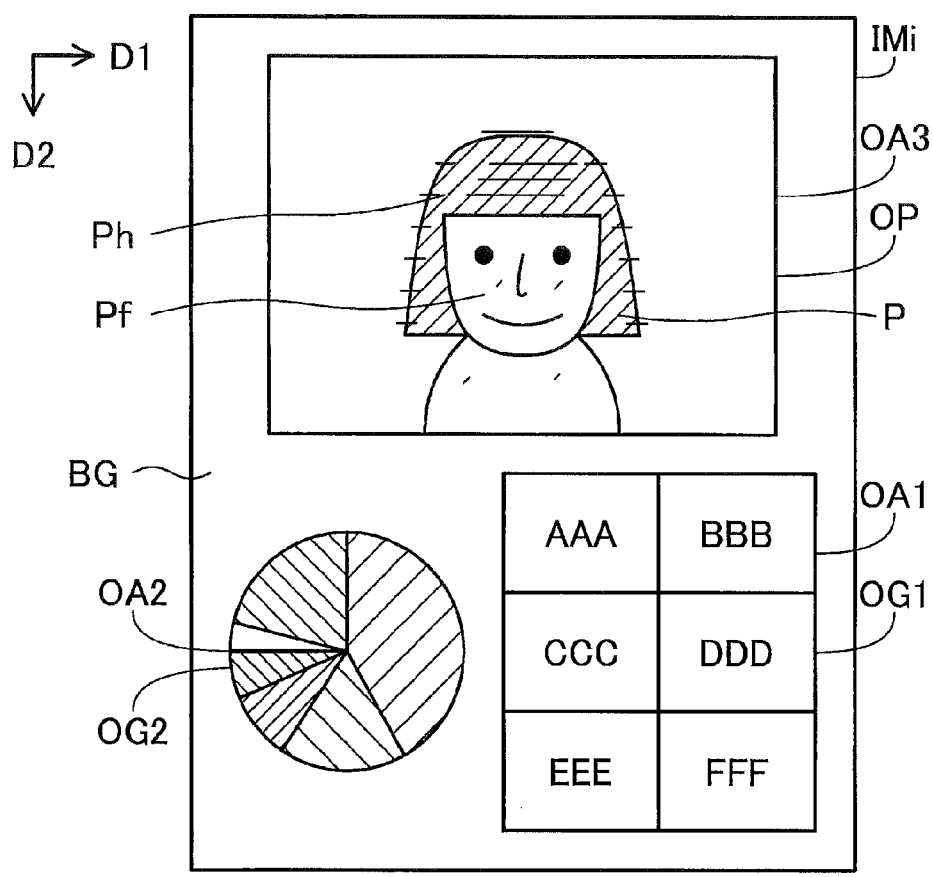
FIG. 3 is an explanatory diagram illustrating an example of an input image represented by input image data.

FIG. 3 is an explanatory diagram illustrating a sample input image IMi represented by the input image data. In the example of FIG. 3, the input image IMi includes one object OP representing a photo, and two objects OG1 and OG2 representing graphics. The photo object OP represents a portrait P of a person. The first graphic object OG1 represents a table, while the second graphic object OG2 represents a pie chart. These objects OP, OG1, and OG2 are arranged over a background BG (a white area, for example) and are separated from each other.

In the embodiment, the input image data is image data described in a page description language. Specifically, data in the Enhanced Metafile Format (EMF) may be used as the input image data. The EMF data includes Graphics Device Interface (GDI) commands, which are drawing commands for drawing elements constituting an object, and parameters used for drawing elements according to the GDI commands. Examples of drawing commands include a command for drawing a figure such as a circle, and a command for decompressing compressed bitmap data. Examples of parameters used for drawing include parameters defining the position and shape of a figure, such as the center position and radius of a circle, and compressed bitmap data embedded in the image data. The photo object OP in FIG. 3 is drawn on the basis of a command for decompressing bitmap data representing a photo. The first graphic object OG1 is drawn on the basis of a command for drawing its borders (frame) and a command for drawing characters representing numerical values. The second graphic object OG2 is drawn on the basis of a command for drawing its borders (a circle) and a command for coloring in each sector of the pie.

In S110 of FIG. 2, the processor 110 generates a mask image for performing an unsharp masking process. An unsharped mask is normally produced by subtracting a smoothed version of the input image IMi from the input image IMi. The image subtracted from the input image IMi for calculating the unsharped mask is called an unsharped image. In the embodiment, the mask image generated in S110 is an image produced by smoothing specific parts of the input image IMi and is the unsharped image subtracted from the input image IMi for calculating the unsharped mask. Hereinafter, the mask image will simply be referred to as the "mask." In S120 the processor 110 executes the unsharp masking process (i.e., a sharpness adjusting process) on the input image IMi using the mask generated in S110. The processes performed in S110 and S120 will be described later in greater detail, but these processes function to generate bitmap data representing an image whose sharpness has been adjusted (hereinafter called the "adjusted image"). In the embodiment, the bitmap data generated in the above process represents the color value for each pixel with a gradation value for each of the red (R), green (G), and blue (B) components. Each component value is set to one of 256 gradations between 0 and 255.

In S130 the processor 110 converts the color value for each pixel in the bitmap data representing the adjusted image from RGB gradation values to CMYK gradation values corresponding to the color components of the colorants used in printing. Correlations between RGB values and CMYK values are predefined in a look-up table (not shown) that is stored in the nonvolatile storage device 130 in advance. The processor 110 performs color conversion by referencing this look-up table.

In S140 the processor 110 performs a halftone process on the data produced from the color conversion process in S130. In the embodiment, error diffusion is performed in the halftone process, but a halftone process using a dither matrix may be performed instead. By performing this halftone process, the processor 110 generates output image data to print an image by the printing unit 200. The output image data is in a format that the printing unit 200 can interpret.

In S150 the processor 110 outputs the output image data to the printing unit 200. In S160 the printing unit 200 prints an image on the basis of the output image data received from the processor 110. Through this process, the adjusted image is printed and the printing process ends.

Figure 4:
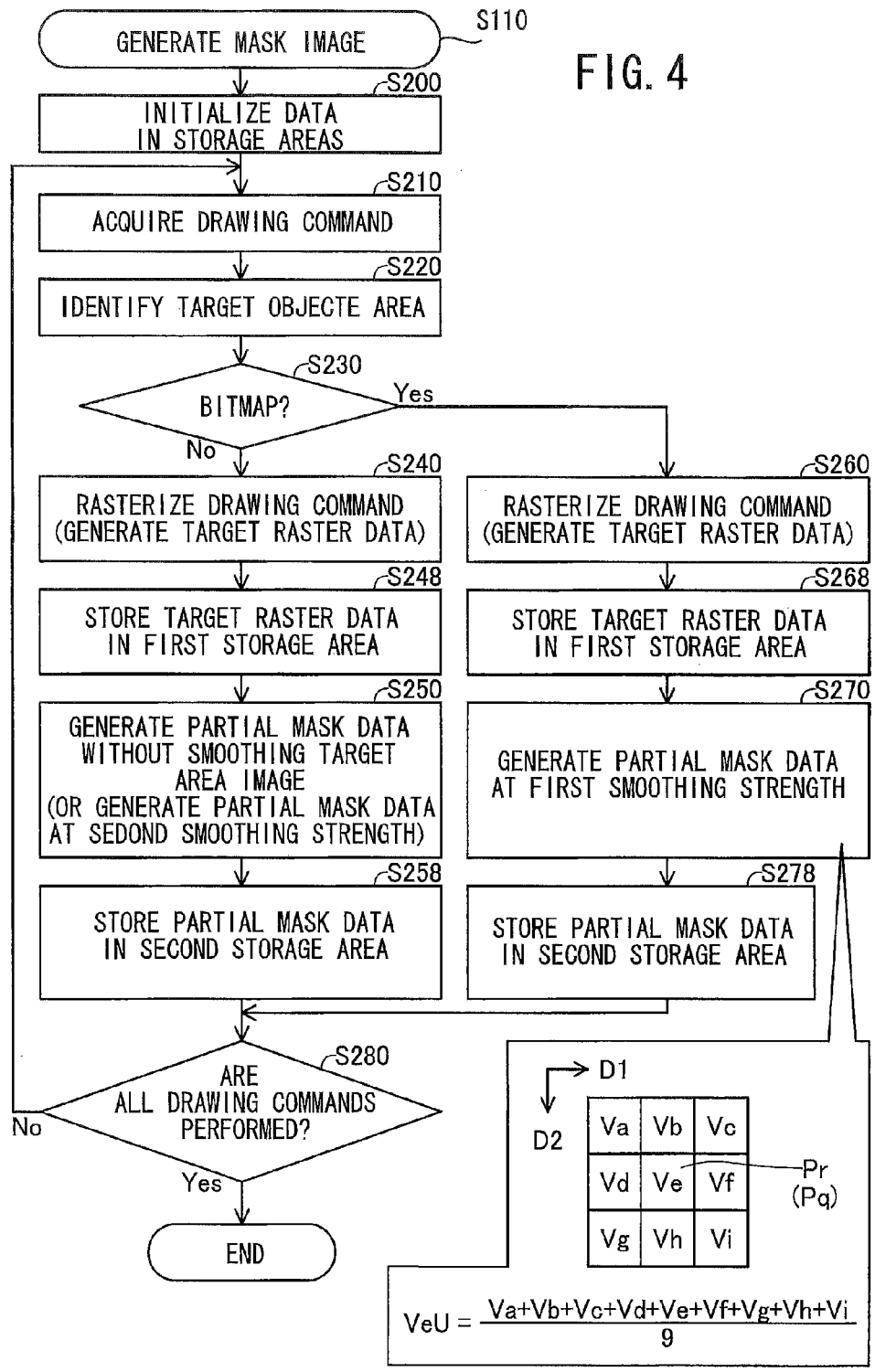
FIG. 4 is a flowchart illustrating steps for generating a mask.

FIG. 4 is a flowchart illustrating steps in the process of S110 in FIG. 2 for generating the mask required for performing the unsharp masking process. In S200 of FIG. 4, the processor 110 allocates a first storage area 121 and a second storage area 122 in the volatile storage device 120. The first storage area 121 is allocated for storing raster data representing the input image IMi, while the second storage area 122 is allocated for storing the mask data. In S200 the processor 110 also initializes the data in the storage areas 121 and 122 to predetermined initial data. The raster data and mask data both represent color values for a plurality of pixels (not shown) that are arranged in a grid, that is, arranged in a first direction D1, and a second direction D2 orthogonal to the first direction D1 (see FIG. 3). In the embodiment, the predetermined initial data used for initializing data in the storage areas 121 and 122 is configured of color values representing the background BG (for example, R=G=B=255). In the embodiment, the color values for all pixels in the storage areas 121 and 122 are initialized to the color value representing the background BG.

In S210 the processor 110 acquires one or more drawing commands from the input image data required for drawing one object. Each object in the input image is identified by separating the plurality of pixels drawn by one or more drawing commands from the background BG. In the embodiment, a single object is defined as all of the one or more elements included in a single contiguous area surrounded by the background BG. In the example of FIG. 3, the three objects OP, OG1, and OG2 are identified from the input image IMi. The processor 110 can identify each object by identifying the positions of elements drawn according to the one or more drawing commands. Hereinafter, the single object drawn by the one or more drawing commands acquired in S210 will be called the "target object."

In S220 the processor 110 identifies a target object area representing the target object. In the embodiment, the target object area is the smallest continuous region encompassing the target object. The processor 110 can identify the target object area by analyzing the one or more drawing commands acquired in S210. In the example of FIG. 3, the processor 110 identifies an object area OA1 based on the first graphic object OG1, an object area OA2 based on the second graphic object OG2, and an object area OA3 based on the photo object OP.

In S230 of FIG. 4, the processor 110 determines whether the target object area is a first type of object area represented by bitmap data. The processor 110 determines that the target object area is the first type of object area (S230: YES) when the drawing commands acquired in S210 include a command for developing the bitmap data. On the other hand, the processor 110 determines that the target object area is a second type of object area (S230: NO) when the drawing commands acquired in S210 do not include a command for developing bitmap data, but rather are configured of other types of commands (commands for drawing elements such as figures and text), i.e., when the target object area is represented by data other than bitmap data. In the example of FIG. 3, the processor 110 determines that the two object areas OA1 and OA2 are the second type of object area (S230: NO) and that the third object area OA3 is the first type of object area (S230: YES).

When the target object area is the first type of object area (S230: YES), in S260 the processor 110 rasterizes all drawing commands for the single target object acquired in S210 in order to generate target raster data representing the image within the target object area (hereinafter called the "target area image"). The target area image represents the target object. Further, the pixel density of the target raster data is set to a prescribed pixel density for the printing process. In the embodiment, the target raster data represents the color value for each pixel in RGB gradation values, where the gradation values are one of 256 gradations between 1 and 255. The raster data may be called bitmap data. Hereinafter, bitmap data generated through the rasterization process in S260 will be called "raster data."

In S268 the processor 110 stores the target raster data generated in S260 in the first storage area 121 of the volatile storage device 120. The size of the first storage area 121 is identical to the data size of raster data representing the entire input image IMi. Correspondences between data storage positions (memory addresses, for example) in the first storage area 121 and pixel positions in the input image IMi are predefined. The processor 110 stores the target raster data in a part of the first storage area 121 having data storage positions corresponding to the pixel positions in the target object area.

In S270 the processor 110 generates a target mask to be applied to the target object area of the first type (hereinafter, this target mask will be called the "first type of partial mask"). The target mask generated in S270 is an image having the same shape as the target object area and is represented by color values for a plurality of pixels of the same number as the number of pixels in the target object area. In the embodiment, the processor 110 generates the first type of partial mask by smoothing the target area image represented by the target raster data generated in S260. An outline of the smoothing process is depicted in the bottom of FIG. 4. In the embodiment, a color value VeU for a target pixel Pq in the first type of partial mask is set to the average of nine color values Va-Vi for nine pixels arranged in three rows and three columns and centered on a pixel Pr in the target area image having the same position as the target pixel Pq. The processor 110 calculates the color value for each pixel in the first type of partial mask for each of the RGB color components. Through this smoothing process, the processor 110 generates partial mask data representing the first type of partial mask. The smoothing process described above smooths the target area image at a predetermined strength (hereinafter called the "first smoothing strength"). Hence, step S270 can be considered a process for generating a partial mask with the smoothing strength set to the first smoothing strength.

Figure 5:
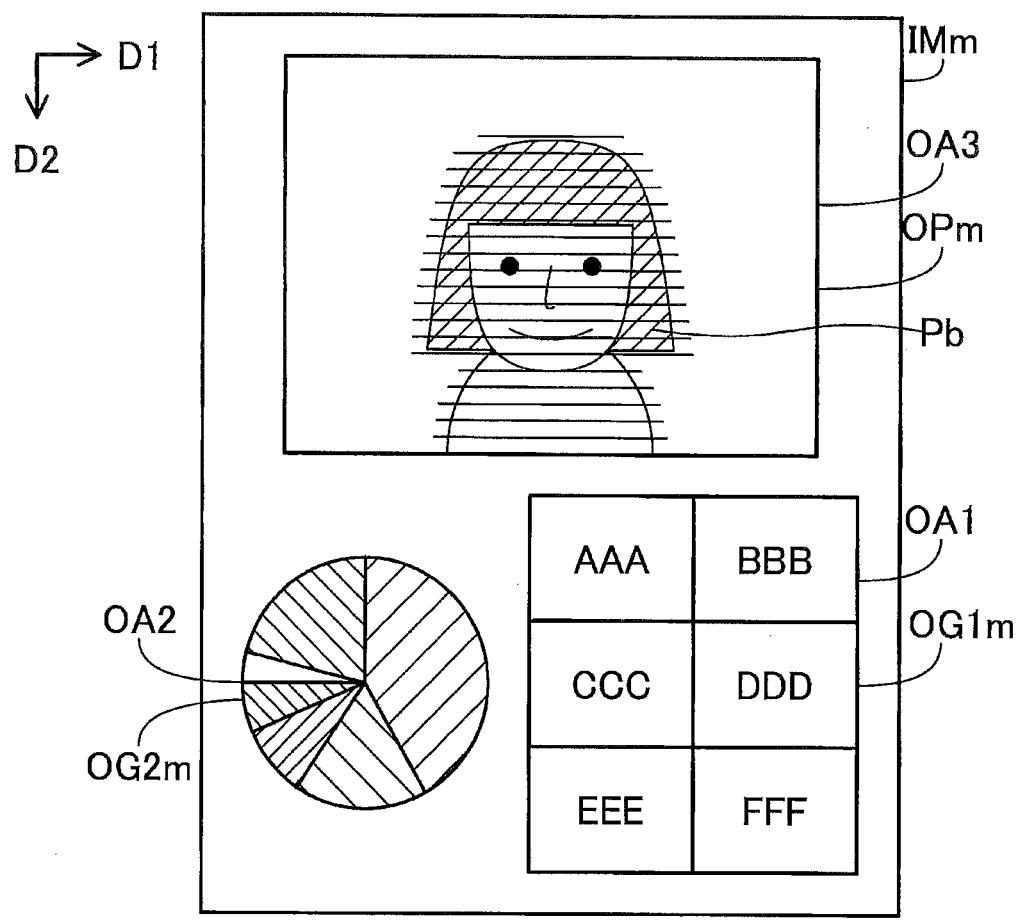
FIG. 5 is an explanatory diagram illustrating an example of a complete mask.

FIG. 5 shows an example of a complete mask IMm applied to the input image IMi. Here, the three object areas OA1, OA2, and OA3 described in FIG. 3 are shown in the drawing. Since the third object area OA3 is the first type of object area, a partial mask OPm for the third object area OA3 is generated in S270 of FIG. 4. As shown in FIG. 5, the partial mask OPm for the third object area OA3 is a blurred version of the photo object OP in FIG. 3 and represents a blurred portrait Pb.

In S278 of FIG. 4, the processor 110 stores the partial mask data representing the first type of partial mask generated in S270 in the second storage area 122. The size of the second storage area 122 is identical to the data size of the bitmap data representing the entire complete mask IMm (i.e., the data size of the raster data representing the entire input image IMi). Correspondences between the data storage positions (memory addresses, for example) in the second storage area 122 and the pixel positions in the complete mask IMm are pre-defined. The processor 110 stores the partial mask data representing the first type of partial mask in the part of the second storage area 122 having data storage positions corresponding to the target object area.

In S280 the processor 110 determines whether the process has been performed for all drawing commands. When there remains an unprocessed drawing command (S280: NO), the processor 110 returns to S210 and performs the process on an unprocessed drawing command.

When the target object area is the second type of object area (S230: NO), in S240 the processor 110 generates target raster data, and in S248 stores this target raster data in the first storage area 121. The processes of S240 and S248 are identical to those of S260 and S268 described above.

In S250 the processor 110 generates a target mask to be applied to a target object area that is the second type of object area (hereinafter this target mask will be called the "second type of partial mask"). In the embodiment, the processor 110 sets the second type of partial mask to the unaltered target area image, without smoothing the target area image. In other words, the processor 110 sets the smoothing strength to zero in S250. The processor 110 produces partial mask data representing the second type of partial mask by copying the target raster data generated in S240.

Since the two object areas OA1 and OA2 are the second type of object area in the example of FIG. 5, in S250 of FIG. 4 the processor 110 will generate partial masks OG1m and OG2m for the corresponding object areas OA1 and OA2 (during two loops of the process). As shown in FIG. 5, the partial masks OG1m and OG2m for the object areas OA1 and OA2 are respectively identical to the images representing the graphic objects OG1 and OG2 in FIG. 3.

In S258 of FIG. 4, the processor 110 stores the partial mask data representing the second type of partial mask generated in S250 in the second storage area 122 of the volatile storage device 120. This process is identical to the process of S278 described above except that the partial mask data represents the second type of partial mask instead of the first type of partial mask. After completing the process in S258, the processor 110 advances to S280.

When the above process has been performed for all drawing commands (S280: YES), the processor 110 ends the process of FIG. 4. Through this process, the processor 110 executes a process for generating target raster data (S240, S260) and a process for storing this target raster data in the first storage area 121 of the volatile storage device 120 (S248, S268) for all drawing commands (and therefore all object areas). Accordingly, by the end of the process in FIG. 4, the processor 110 has stored raster data representing the entire input image IMi in the first storage area 121 (hereinafter called the "input raster data").

Further, the processor 110 executes a process for generating partial mask data representing a target mask (S250, S270) and a process for storing this partial mask data in the second storage area 122 of the volatile storage device 120 (S258, S278) for all object areas. Hence, by the time the process in FIG. 4 is completed, all mask data representing the complete mask IMm corresponding to the entire input image IMi is now stored in the second storage area 122. In the embodiment, mask data for the complete mask IMm is generated by executing the smoothing process only on parts of the input raster data representing object areas of the first type (S270 of FIG. 4).

Figure 6:
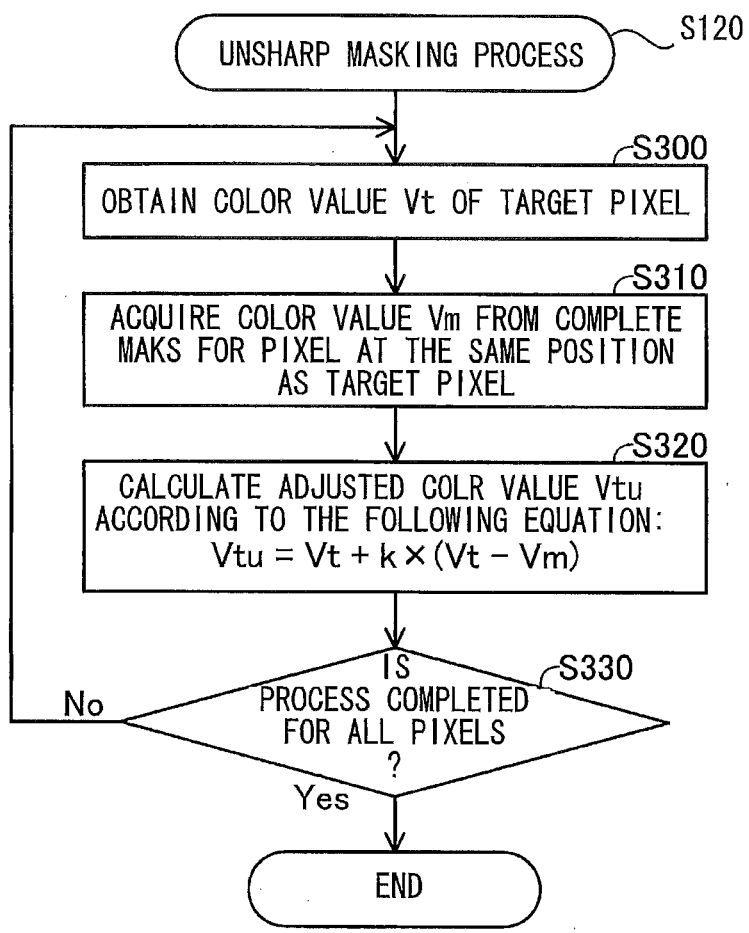
FIG. 6 is a flowchart illustrating steps in a sharpness adjusting process.

In S120 of FIG. 2 described above, the processor 110 executes a sharpness adjusting process on the input image IMi using the input raster data stored in the first storage area 121 and the complete mask data stored in the second storage area 122. FIG. 6 is a flowchart illustrating steps in the sharpness adjusting process, and specifically the steps for adjusting color values for a single color component. In the embodiment, the processor 110 adjusts the color values for all three RGB color components according to the process described in FIG. 6.

In S300 the processor 110 selects one pixel from among unprocessed pixels in the input image IMi and obtains a color value Vt for the selected pixel (hereinafter called the "target pixel") from the input raster data. In S310 the processor 110 acquires a color value Vm for the pixel in the complete mask IMm having the same position as the target pixel. In S320 the processor 110 calculates an adjusted color value Vtu according to the equation Vtu=Vt+k×(Vt−Vm) in the embodiment. Here, the coefficient k is a predetermined value. For example, the coefficient k may be set to a value greater than 0 but smaller than 1. The color value calculated according to "Vt−Vm" in this equation is the color value obtained by subtracting a value in the complete mask IMm (the unsharped image in this case) from a value in the input image IMi. Collectively, the color values (Vt−Vm) represent an image neighboring edges in the input image IMi (hereinafter, this type of image is called to as an "unsharped mask"). In the equation for calculating the adjusted color value Vtu, an unsharped mask is calculated by subtracting the complete mask IMm (unsharped image) from the input image IMi and then adding the product of this unsharped mask and the coefficient k to the input image IMi. An image process employing this type of equation is called an unsharp masking process. The unsharp masking process enhances the sharpness of an image. The larger smoothing strength is used to generate the partial mask, the more the sharpness of an image is enhanced. The larger the coefficient k is applied to the unsharped mask, the greater the sharpening effect is. Hence, the smoothing strength and the coefficient k correspond to the degree of sharpness adjustment. In the embodiment, the processor 110 overwrites data stored in the first storage area 121 that represents the pre-adjusted color value Vt with data representing the adjusted color value Vtu.

In S330 the processor 110 determines whether the above process has been completed for all pixels. If there remain unprocessed pixels (S330: NO), the processor 110 returns to S300 and executes the above process on an unprocessed pixel. When all pixels have been processed (S330: YES), the process in FIG. 6 ends. In this way, the processor 110 executes the unsharp masking process on the entire input image IMi using the complete mask IMm. In the embodiment, the processor 110 generates data representing an adjusted image by performing the unsharp masking process on input raster data generated by rasterizing operation based on the drawing commands. Once the process in FIG. 6 is completed, data representing the adjusted image generated by the unsharp masking process has been stored in the first storage area 121.

Figure 7:
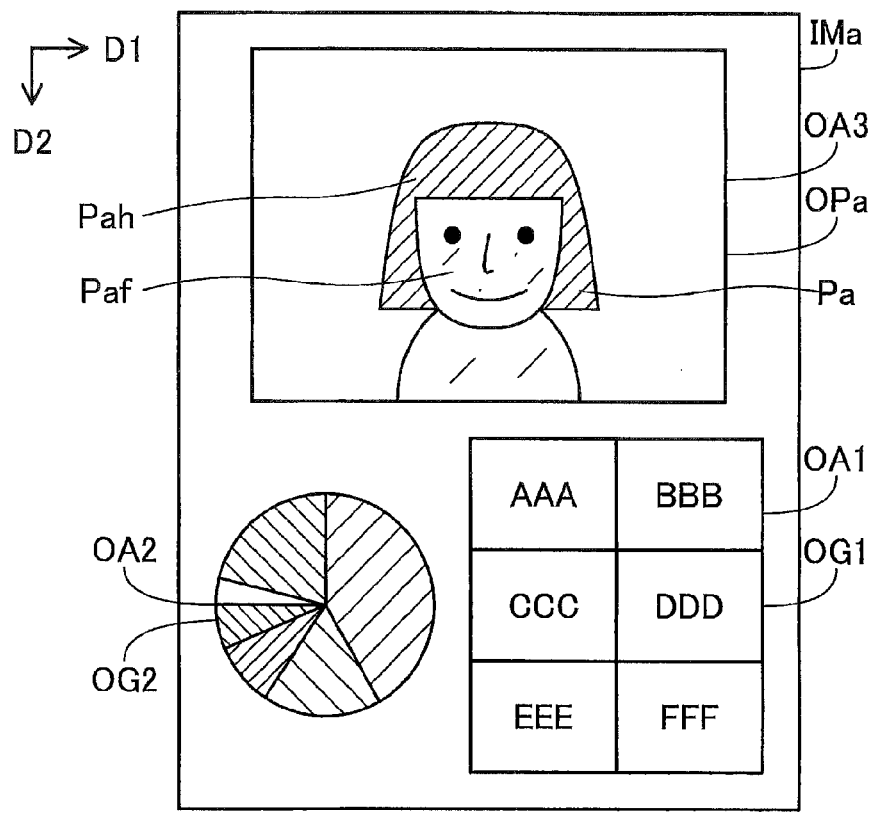
FIG. 7 is an explanatory diagram illustrating an example of an adjusted image.

FIG. 7 is an explanatory diagram showing an example of an adjusted image IMa. This example depicts the three object areas OA1, OA2, and OA3 described with reference to FIG. 3. The sharpness in the third object area OA3 is enhanced by the unsharp masking process since the partial mask OPm (see FIG. 5) obtained by smoothing the photo object OP in the input image IMi was applied to the third object area OA3. The third object area OA3 of the adjusted image IMa represents a photo object OPa whose sharpness is more enhanced than that of the photo object OP in the input image IMi. For example, a hair part Pah of a portrait Pa in the photo object OPa is rendered sharper than a hair part Ph of the portrait P in the input image IMi.

The partial masks OG1m and OG2m (see FIG. 5) representing the same images as the images in the corresponding object areas OA1 and OA2 in the input image IMi are applied to the object areas OA1 and OA2. Hence, the image produced after the unsharp masking process is no different from the image before the process (i.e., the sharpness is unchanged) since the "Vt−Vm" is 0 in the equation described above for the adjusted color value Vtu. The first object area OA1 in the adjusted image IMa represents the same image as the image in the first object area OA1 of the input image IMi. That is, the first object are OA1 represents the first graphic object OG1. Similarly, the second object area OA2 in the adjusted image IMa represents the same image as the image in the second object area OA2 of the input image IMi. That is, the second object area OA2 represents the second graphic object OG2.

Figure 8:
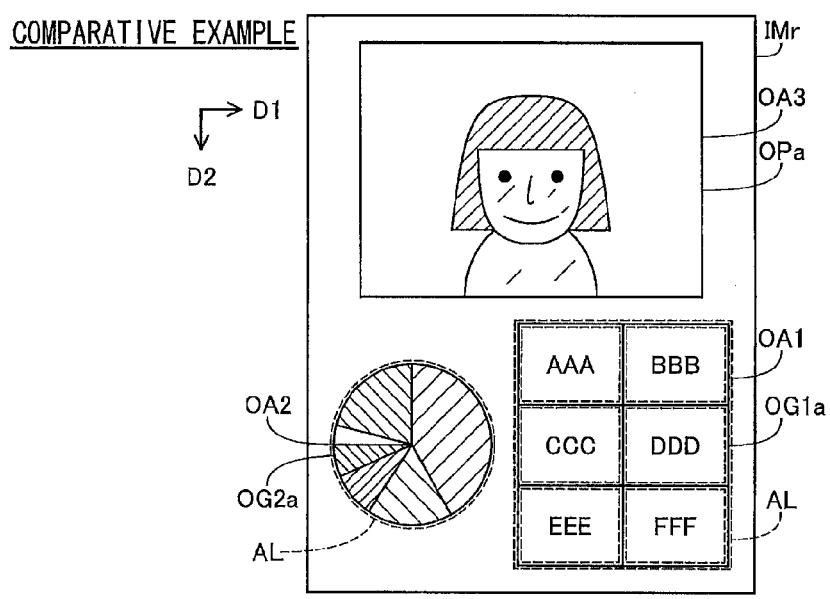
FIG. 8 is an explanatory diagram illustrating an example of an adjusted image for comparison.

FIG. 8 is an explanatory diagram showing an example of an adjusted image IMr for comparison (hereinafter called the "comparative image IMr"). The comparative image IMr is an adjusted image obtained by applying a sharpness adjusting process at the same strength for the entire input image IMi (see FIG. 3). The comparative image IMr differs from the adjusted image IMa in FIG. 7 in that the two object areas OA1 and OA2 in the comparative image IMr represent objects OG1a and OG2a whose sharpness is more emphasized than that of the graphic objects OG1 and OG2 in the input image IMi. As a result of this sharpness emphasis, visible lines AL appear near edges in the objects, such as the borders. The lines AL near the edges are not present in the input image IMi. If the comparative image IMr were to be printed, a person viewing the printed image may feel that the lines AL in the objects OG1a and OG2a look unnatural.

However, in the embodiment sharpness is emphasized only in object areas of the first type represented by bitmap data and not in object areas of the second type represented by data other than bitmap data.

Generally, images represented by bitmap data are less sharp than the desired degree of sharpness. That is, bitmap data is often generated with a reading device such as a digital camera or scanner. When data is generated by a reading device, the focal point of the reading device may not be aligned with the reading target, leading to the generation of data representing a blurred image. Further, bitmap data is often irreversibly compressed (as in the JPEG format). When such data is repeatedly compressed and decompressed, the image often becomes blurred. Thus, the quality of the image can be improved by emphasizing sharpness in object areas of the first type represented by bitmap data.

Further, because objects in object areas of the second type represented by data other than bitmap data are drawn by rasterizing operation based on the drawing commands, there is a high probability that the objects are already depicted with an appropriate degree of sharpness. Enhancing the sharpness in these areas could produce unnatural lines AL, as described with reference to FIG. 8. By not emphasizing sharpness in such areas, it is possible to prevent such unnatural lines AL from becoming noticeable.

In the first embodiment described above, as shown in FIG. 4, the processor 110 generates the complete mask IMm (i.e., an unsharped image; see FIG. 5) by setting the smoothing strength (i.e., the degree of sharpness adjustment) for each object area. Consequently, the processor 110 of the embodiment can print a plurality of objects at suitable sharpnesses better than when the processor performs sharpness adjustments at the same strength for all object areas.

Further, the processor 110 generates a single complete mask IMm (FIGS. 4 and 5) to be applied to the entire input image IMi by setting the smoothing strength (i.e., the degree of sharpness adjustment) for each object area. Next, the processor 110 executes the unsharp masking process (S120 of FIG. 2) by applying the single complete mask IMm to the input image IMi. Since this method enables the processor 110 to execute an unsharp masking process on the plurality of object areas using a single input image IMi, the processor 110 can perform a simpler unsharp masking process than when the unsharp masking process is repeatedly performed for each object area while varying the details of the process. In this way, the processor 110 can easily print a plurality of objects at suitable sharpnesses.

Further, the processor 110 generates, as the unsharped image for calculating the unsharped mask, a partial mask for a first type of object area represented by bitmap data using an image obtained by smoothing the image in the first type of object area (S270 of FIG. 4). Next, the processor 110 generates, as the unsharped image for calculating the unsharped mask, a partial mask for a second type of object area represented by data other than bitmap data using the same image as the image in the second type of object area (S250 of FIG. 4). Hence, the processor 110 can easily emphasize sharpness in object areas of the first type while not emphasizing sharpness in object areas of the second type, even when executing the unsharp masking process using a single complete mask IMm. As a result, the processor 110 can improve the image quality in object areas of the first type while preventing unnatural lines from becoming noticeable in object areas of the second type.

Further, the processor 110 identifies an object area as the first type of object area or the second type of object area on the basis of the type of drawing commands used for drawing the object in the object area (S230 of FIG. 4). Hence, by appropriately identifying the types of object areas, the processor 110 can generate a suitable partial mask for each object area.

Further, the processor 110 executes an identification process in S220 of FIG. 4 for identifying a single target object area and executes a generation process including a process for generating target raster data and a process for generating a partial mask in S240, S250, S260, and S270. After executing the identification process and generation process for a single target object area, the processor 110 executes the identification process and generation process for another target object area (see FIG. 4). Accordingly, a result of a process for analyzing drawing commands can be shared among the processes for generating target raster data and for generating a partial mask, thereby requiring less processing load than when two process for analyzing drawing commands are separately performed for the generation of target raster data and for the generation of a partial mask. However, a process for repeating the generation of target raster data for each of the plurality of object areas may be performed separately from a process for repeating the generation of a partial mask for each of the plurality of object areas.

Further, the processor 110 generates input raster data representing the input image IMi (S240, S248, S260, and S268 of FIG. 4). Subsequently, the processor 110 obtains an image by executing the smoothing process on the portions of the input raster data representing object areas of the first type and generates the complete mask IMm using the obtained image as the unsharped image for calculating the unsharped mask (S270 of FIG. 4). Accordingly, the processor 110 can generate a complete mask IMm suited to the input image IMi.

B. Second Embodiment

FIG. 9 shows a portion of a flowchart for a mask generating process according to a second embodiment. The mask generating process according to the second embodiment differs from that of the first embodiment shown in FIG. 4 in that step S270 of FIG. 4 is replaced with steps S272, S274, and S276 shown in FIG. 9. All other steps in the mask generating process according to the second embodiment are identical to those in the first embodiment described above with reference to FIG. 4. Steps in the printing process according to the second embodiment are also identical to those in the first embodiment described in FIG. 2. The image processing device that executes the printing process in the second embodiment has a hardware structure identical to the structure in FIG. 1.

After completing S268 in the mask generating process of the second embodiment, in S272 the processor 110 divides the target object area, which is the first type of object area in this case, into process parts of the first type and process parts of the second type by analyzing the image in the target object area. The processor 110 uses the target raster data generated in S260 of FIG. 4 for this analysis. A process part of the first type is a part that has relatively large changes in color values as position in the image changes. That is, the process part of the first type is a part that has relatively large changes in color values depending on change of position in the image. The process part of the second type is a part that has relatively small changes in color values as position in the image changes. That is, the process part of the second type is a part that has relatively small changes in color values depending on change of position in the image. In other words, change in color values in the process part of the first type according to positional change is larger than change in color values in the process part of the second type according to positional change.

FIG. 10 is an explanatory diagram showing an example of a complete mask IMm2 generated in the mask generating process according to the second embodiment. The complete mask IMm2 in the example of FIG. 10 is a complete mask generated on the basis of the input image IMi in FIG. 3 and differs from the complete mask IMm of FIG. 5 in that the image in the third object area OA3 is divided into a first type of process part Pb2h and a second type of process part Pb2f. The complete mask IMm2 includes a partial mask OPm2. The partial mask OPm2 corresponds to the third object area OA3 and represents a portrait PB2. The first type of process part Pb2h is the part of the image representing the hair in the portrait Pb2, while the second type of process part Pb2f is the part representing the face in the portrait Pb2.

In the second embodiment, the processor 110 classifies each pixel in a first type of object area into the process part of the first type or the process part of the second type according to the following method. First, the processor 110 calculates a color value difference indicating the difference between the color value of a target pixel and the color value of pixel adjacent to the target pixel in the first direction D1. Specifically, the color value difference is the sum of the differences for the three RGB color components. This color value difference is calculated for each pixels in the first type of object area. Next, the processor 110 identifies contiguous areas in the first type of object area having contiguous pixels whose color value difference is smaller than or equal to a predetermined color value difference. That is, all color value differences in the contiguous area are smaller than or equal to the predetermined color value difference. The processor 110 then calculates the number of pixels in each contiguous area. When the number of pixels in a single contiguous area is larger than or equal to a predetermined pixel number threshold, the processor 110 classifies this contiguous area as a process part of the second type. Pixels not classified into the process part of the second type are sorted into the process part of the first type. While not indicated in the drawing of FIG. 10, parts representing organs, such as the eyes and mouth, may also be classified as the process part of the first type. Parts whose color values change very little as position changes, such as parts representing skin, are classified as the process part of the second type.

In S274 of FIG. 9, the processor 110 generates a partial mask to be applied to the process part of the first type. In the second embodiment, as in the process of S270 in FIG. 4, the processor 110 generates a partial mask by smoothing the image in the process part of the first type represented by the target raster data generated in S260 of FIG. 4. In the example of FIG. 10, the first type of process part Pb2h in the partial mask OPm2 of the third object area OA3 is a blurred image of the hair part Ph in the portrait P of FIG. 3. S274 may be considered a smoothing process in which the degree of smoothing is set to the first smoothing strength.

In S276 of FIG. 9, the processor 110 generates a partial mask to be applied to the process part of the second type. In the second embodiment, the processor 110 employs the unaltered image in the process part of the second type represented by the target raster data generated in S260 of FIG. 4 as the partial mask, without smoothing the image, as in the process of S250 in FIG. 4. Hence, S276 may be considered a process for generating a partial mask when the smoothing strength is set to zero. In the example of FIG. 10, the second type of process part Pb2f in the partial mask OPm2 of the third object area OA3 is the same image as a face part Pf in the portrait P of FIG. 3.

In S278 of FIG. 4, the processor 110 stores partial mask data representing the partial masks generated in S274 and S276 in the second storage area 122 of the volatile storage device 120.

Figure 11:
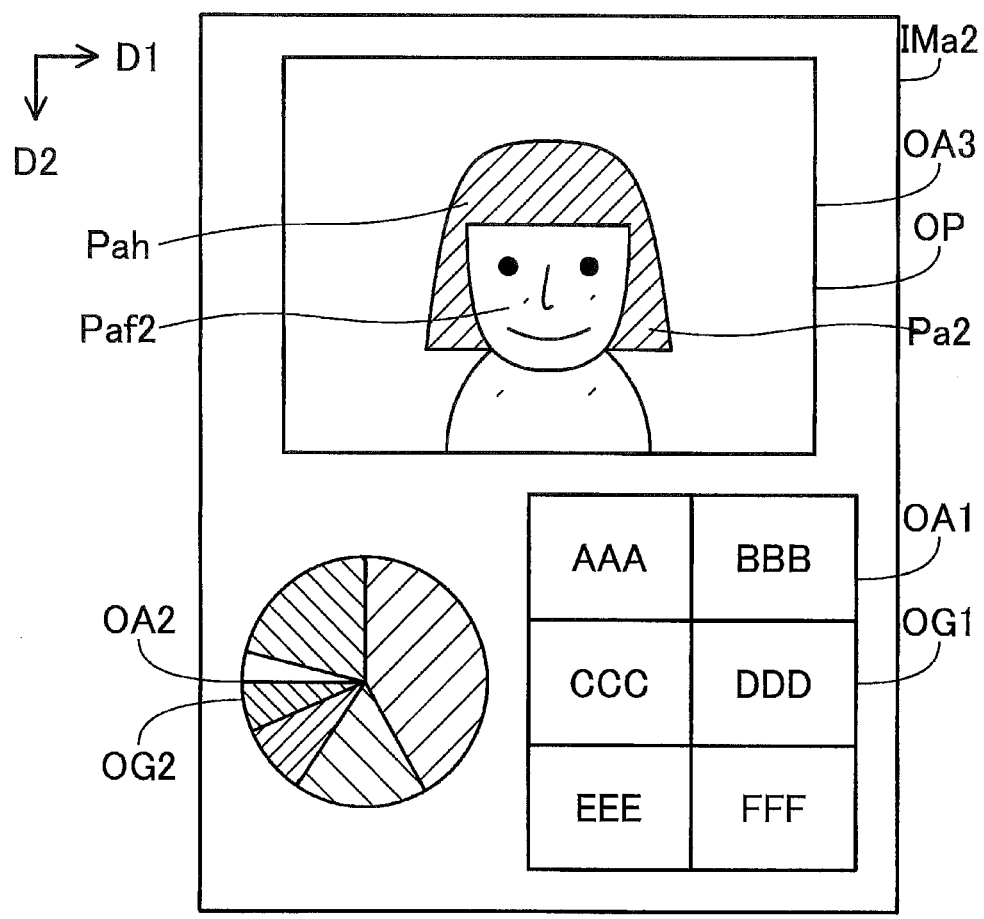
FIG. 11 is an explanatory diagram illustrating an example of an adjusted image according to the second embodiment.

FIG. 11 is an explanatory diagram showing an example of an adjusted image IMa2. The adjusted image IMa2 is produced in the unsharp masking process using the complete mask IMm2 of FIG. 10. The adjusted image IMa2 differs from the adjusted image IMa in FIG. 7 in that a face part Paf2 corresponding to the second type of process part Pb2f in FIG. 10 is rendered more smoothly than the same face part Paf in FIG. 7. All other parts of the adjusted image IMa2 are identical to the same parts of the adjusted image IMa in FIG. 7. For example, the hair part Pah corresponding to the first type of process part Pb2h in FIG. 10 is the same as the hair part Pah in FIG. 7. This hair part Pah is rendered with more sharpness than the hair part Ph in the input image IMi of FIG. 3.

In this way, the processor 110 in the second embodiment determines process parts of the first type and process parts of the second type by analyzing the image in the first type of object area (S272 of FIG. 9). In the embodiment, a process part of the first type has relatively large changes in color values at different positions in the image, while a process part of the second type has relatively small changes in color values at different positions. The processor 110 obtains smoothed images by smoothing images in the process parts of the first type and generates partial masks for process parts of the first type using the smoothed images as the unsharped image for calculating the unsharped mask (S274). The processor 110 also generates partial masks for process parts of the second type using the unaltered images in the process part of the second type as the unsharped image for calculating the unsharped mask (S276).

Through this process, sharpness is not emphasized in process parts of the second type, which have relatively small changes in color values as position in the image changes. Therefore, this method can reduce the likelihood of the sharpness being excessively emphasized in parts representing smooth surfaces (or smooth region) of the object (skin, for example) within a first type of object area represented by bitmap data. If sharpness were emphasized in process parts of the second type, fine edges (minute irregularities, for example) in the smooth surface of an object, such as the skin of a human face, may be excessively emphasized, causing an image that should be smooth to appear rough. Such rough images are likely to unnatural for a person viewing the printed image. The method of the second embodiment reduces the likelihood of this problem.

Further, the method according to the second embodiment emphasizes sharpness in process parts of the first type, which have relatively large changes in color values depending on change of position in the image. Accordingly, this method can emphasize sharpness in parts representing detailed objects (hair and grass, for example) within a first type of object area represented by bitmap data. Thus, the method of the second embodiment improves the clarity of detailed objects.

Note that the image process for printing in the second embodiment is identical to the image process according to the first embodiment described above, except that the method according to the second embodiment generates partial masks after separating object areas of the first type into process parts of the first type and process parts of the second type. Accordingly, the second embodiment can obtain the same operational advantages described in the first embodiment.

C. Variations of the Embodiments (1) While the three RGB color components are adjusted in the unsharp masking process of the embodiments, other types of color components may be adjusted instead. For example, a luminance component may be adjusted in the unsharp masking process. Here, the processor 110 may generate data representing color values in the YCbCr color space as the input raster data, for example, and may adjust the color value for the Y component in the unsharp masking process.

(2) In S250 of FIG. 4, the processor 110 may generate partial masks for object areas of the second type using images obtained by smoothing the corresponding images in the object areas of the second type as the unsharped image for calculating the unsharped mask. Here, the smoothing strength used in S250 (referred to as the "second smoothing strength") may be weaker than the first smoothing strength used in S270. This method can also improve image quality by enhancing the sharpness of images in object areas of the second type while suppressing unnatural lines AL (see FIG. 8) from being noticeable.

Similarly, in S276 of FIG. 9, the processor 110 may generate partial masks for process parts of the second type using images obtained by smoothing the corresponding images in the process parts of the second type as the unsharped image for calculating the unsharped mask. Here, the smoothing strength used in S276 (the second smoothing strength, for example) may be weaker than the smoothing strength used in S274 (the first smoothing strength in this example). Thus, the method can improve image quality by suitably enhancing sharpness in process parts of the second type. Note that the smoothing strength used in S274 of FIG. 9 may differ from the first smoothing strength used in S270 of FIG. 4. Further, the smoothing strength used in S276 of FIG. 9 may differ from the second smoothing strength used in S250 of FIG. 4.

Note that any of various methods may be used to produce a plurality of different smoothing strengths. For example, in the outline of the smoothing process shown in the bottom of FIG. 4, a weighted average may be used as the color value VeU for the partial mask, where the weighted average is obtained by maintaining the weight for the color value Ve of the pixel Pr at 1 while setting weights for the color values Va-Vd and Vf-Vi of pixels other than the pixel Pr to values less than 1. In this way, it is possible to weaken the smoothing strength. Thus, the smoothing strength can be adjusted by adjusting the weights applied to the color values of each pixel. In other words, the smoothing strength can be increased by reducing the weight for the color value of the pixel Pr or by increasing the weights applied to the color values of pixels other than the pixel Pr. Alternatively, the average value of pixel values for twenty-five pixels arranged in five rows and five columns and centered on the pixel Pr may be employed as the color value VeU for the partial mask in S270 (or, for the partial mask having the first smoothing strength), while the average value of pixel values for nine pixels arranged in three rows and three columns and centered on the pixel Pr may be used as the color value VeU for the partial mask in S250 (or, for the partial mask having the second smoothing strength). Thus, it is possible to adjust the smoothing strength by adjusting the range of pixels used for calculating the color value VeU of the partial mask. In this case, smoothing strength is increased as the range of pixels is widened.

In any case, the smoothing strength for generating an unsharped image (the complete masks IMm and IMm2 in the embodiments) used for calculating the unsharped mask indicates the degree of sharpness adjustment. Accordingly, S270 (FIG. 4) and S274 (FIG. 9) can be considered processes for generating partial masks by setting the degree of sharpness adjustment to a first strength. Similarly, S250 (FIG. 4) and S276 (FIG. 9) can be considered processes for generating partial masks by setting the degree of sharpness adjustment to a second strength weaker than the first strength. When smoothing is omitted in these steps, the second strength is set to zero.

Note that the smoothing strength can be evaluated on the basis of changes in edge intensity. Edge intensity is calculated for each pixel by applying a Sobel filter known in the art. Here, the sum of edge intensities for all color components adjusted in the unsharp masking process is employed as the edge intensity for a single pixel (hereinafter called the "pixel edge intensity"). In the embodiments described above, the sum of the edge intensity for the R component, the edge intensity for the G component, and the edge intensity for the B component is used as the pixel edge intensity. A total edge intensity is defined as the sum of pixel edge intensities for all pixels in an image. The total edge intensity for all pixels in an image to be smoothed is reduced through smoothing. The smaller the total edge intensity of the smoothing-processed image is, the higher the smoothing strength is. That is, the larger a first edge intensity difference is, the higher the smoothing strength is. Here, the first edge intensity difference is defined as a value obtained by subtracting the total edge intensity of the smoothing-processed image from the total edge intensity of the unprocessed image. When smoothing is omitted, the first edge intensity difference will be zero. Accordingly, the first edge intensity difference may be used as an index for smoothing strength.

Similarly, the strength (or degree) of sharpness adjustment can be evaluated using the total edge intensity. The total edge intensity increases as a result of the sharpness adjusting process (unsharp masking process). The higher the total edge intensity of the sharpness-adjusting-processed image is, the higher the degree of the sharpness adjustment by the sharpness adjusting process is. That is, the larger a second edge intensity difference is, the higher the degree of the sharpness adjustment by the sharpness adjusting process is. Here, the second edge intensity difference is defined as a value obtained by subtracting the total edge intensity of the unprocessed image from the total edge intensity of the sharpness-adjusting-processed image. When sharpness is not adjusted, the second edge intensity difference will be zero. Accordingly, the second edge intensity difference can be used as an index for the degree (or strength) of the sharpness adjustment by the sharpness adjusting process.

(3) Any of various processes for smoothing color values may be employed in place of the smoothing process described in FIG. 4 as the smoothing process for generating an unsharped image. For example, a process that employs weighted averages by assigning larger weights to pixels that are closer in distance to the pixel Pr may be employed (a process employing a Gaussian filter, for example).

(4) Various other methods than the method described in S272 of FIG. 9 may be used for dividing a first type of object area into process parts of the first type and process parts of the second type. For example, a method using edge intensity may be employed. In this case, the processor 110 calculates the pixel edge intensity of each pixel in a first type of object area and identifies contiguous areas of contiguous pixels whose pixel edge intensity is smaller than or equal to a preset edge threshold. Next, the processor 110 calculates the number of pixels in each contiguous area. The processor 110 classifies a single contiguous area as a process part of the second type when the number of pixels in the contiguous area is greater than or equal to a preset pixel number threshold. Pixels not classified into process parts of the second type are classified into process parts of the first type.

Alternatively, a method using image recognition may be employed. Here, the processor 110 identifies a facial area representing a face in a portrait by analyzing the image in a first type of object area. The processor 110 classifies facial areas as process parts of the second type and classifies other areas as process parts of the first type. Any well-known facial recognition technique may be used as the method for identifying facial areas. For example, the processor 110 may employ pattern matching as the method of identifying facial areas, using prescribed organ images (images representing eyes, mouths, etc.) as the patterns.

(5) Various images used in the unsharp masking process may be employed in place of the unsharped image as the mask image generated in S110 of FIG. 2. For example, the processor 110 may generate an image represented by "Vt−Vm" in the equation "Vtu=Vt+k×(Vt−Vm)" for calculating the adjusted color value Vtu (i.e., an unsharped mask) as the mask image. That is, each pixel of the mask image has a pixel value "Vt−Vm". Alternatively, the processor 110 may generate an image expressed by "k×(Vt−Vm)" as the mask image. That is, each pixel of the mask image has a pixel value "k×(Vt−Vm)". In any case, a partial mask to be applied to the target object area is generated from the mask image in S250 and S270 of FIG. 4 and in S274 and S276 of FIG. 9. In S258 and S278 of FIG. 4, the processor 110 stores partial mask data representing the partial mask generated above in the second storage area 122 of the volatile storage device 120. Thus, when the process of FIG. 4 is completed, data representing the entire mask image will be stored in the second storage area 122.

In the embodiments described above, the entire unsharp masking process can be divided into the process for generating a mask image (S110 of FIG. 2) and the remaining processes (S120). As shown in FIG. 4, the mask image is generated through a process of repeating a conditional branch for each of a plurality of object areas (hereinafter called a "branch and loop process"). The remaining process is performed with a simple loop that does not require a conditional branch for each object area, as illustrated in FIG. 6. However, when the portion of the entire unsharp masking process incorporated in the branch and loop process is large, the branch and loop process becomes more complex, increasing the potential for problems (for example, a higher potential for errors and an increase in development costs). Therefore, it is preferable to reduce the portion of the entire unsharp masking process incorporated in the branch and loop process.

For example, it is preferable to generate an unsharped image as the mask image as described above in S110 of the embodiments. If an unsharped mask (for example, the image represented by "Vt−Vm") were to be used as the mask image, the process for calculating the unsharped mask would be incorporated in the branch and loop process in addition to the process for generating the unsharped image, leading to a more complex branch and loop process. By employing an unsharped image as the mask image, it is possible to eliminate the process of calculating the unsharped mask (calculating Vt−Vm) from the branch and loop process, thereby simplifying the branch and loop process and reducing the potential for problems.

(6) Various other methods may be used to set the degree of sharpness adjustment for each object area in place of the method of setting, for each object area, a smoothing strength required for generating an unsharped image. For example, it is possible to employ a method of setting, for each object area, the coefficient k in the equation "Vtu=Vt+k×(Vt−Vm)" used to calculate the adjusted color value Vtu. In this case, the processor 110 sets the coefficient k to a first value and generates an image represented by "k×(Vt−Vm)" as a partial mask in S270. In S250 the processor 110 sets the coefficient k to a second value that is smaller than the first value and generates an image represented by "k×(Vt−Vm)" as the partial mask (where the second value may be set to zero). Here, the color value Vm used in S250 and S270 may be the color value of the target pixel in the unsharped image that has been smoothed at the same smoothing strength.

(7) The input image data may be expressed in any of various other formats using a page description language other than the EMF. For example, the input image data may be expressed in a format described in a page description language unique to the printing unit 200 or in a page description language independent of the printing unit 200, such as the Portable Document Format (PDF).

Alternatively, the bitmap format may be used in place of a format in which data is described using a page description language. In this case, the processor 110 analyzes the bitmap data to identify object areas and their types. Next, the processor 110 treats object areas of specific types (photo object areas, for example) as the first type of object area and treats all other types of object areas as the second type of object area.

Any method known in the art may be employed as the method for identifying object areas and their types, such as the following method. In this method, the processor divides the input image into a plurality of process areas (rectangular areas of a prescribed size, for example). Next, the processor may identify process areas that include only pixels of colors within a prescribed background color range (a partial color range including white, for example) as process areas representing background that are to be excluded from processing. The processor calculates the variance of color values in each of the remaining process areas for a specific color component (luminance values, for example). The processor classifies process areas having a variance larger than a prescribed photo threshold as photo areas and classifies process areas having a variance less than or equal to the photo threshold as other areas, where other areas are areas representing text or graphics, for example. Next, the processor identifies a single continuous area including contiguous process areas of the same type as a single object area. Note that data other than variance, such as, the number of colors employed in each process area, may be used for identifying object areas. Further, a combination of data types may be used to identify a plurality of types of object areas.

(8) Other techniques for generating a mask image may be employed in place of the technique described in the embodiments. For example, in S250 and S270 of FIG. 4 the processor 110 may generate a partial mask by rasterizing operation based on drawing commands according to a smoothing strength rather than using the target raster data.

(9) The image processing device 100 in FIG. 1 may be a device of a different type than a personal computer, such as a digital camera, scanner, or smartphone, or may constitute part of a printing device. Further, a plurality of devices that can communicate over a network (computers, for example) may each implement some of the functions of the image process performed by the image processing device so that the devices as a whole can provide the functions required for implementing the image process. (Here, the system including the devices corresponds to the image processing device.)

Part of the configuration of the embodiments implemented in hardware in the embodiment described above may be replaced by software and, conversely, part of the configuration of the embodiments implemented in software may be replaced by hardware. For example, functions of the processor 110 (function for generating the mask image, function for performing the unsharp masking process, and etc) are executed by a dedicated hardware circuit.

When all or part of the functions of the present disclosure are implemented with computer programs, the programs can be stored on a computer-readable storage medium (a non-temporary storage medium, for example). The programs may be used on the storage medium (computer-readable storage medium) on which they are supplied, or may be transferred to a different storage medium (computer-readable storage medium). The "computer-readable storage medium" may be a portable storage medium, such as a memory card or a CD-ROM; an internal storage device built into the computer, such as any of various ROM or the like; or an external storage device, such as a hard disk drive, connected to the computer.

Any configuration or any process in the first embodiment can be combined with any configuration or any process in the second embodiment.

While the disclosure has been described in detail with reference to the above embodiments thereof, it would be apparent to those skilled in the art that various changes and modifications may be made therein.

What is claimed is:

1. An image processing device comprising:
a processor configured to perform:
acquiring input image data representing an input image having a plurality of objects, the plurality of objects including a first object and a second object different from the first object;
identifying a plurality of object regions in the input image, the plurality of object regions representing respectively the plurality of objects, the plurality of object regions including a first object region and a second object region, the first object region representing the first object, the second object region representing the second object;
generating a mask image using sharpness adjustment degrees that are set for the plurality of object regions respectively, the sharpness adjustment degrees including a first degree and a second degree different from the first degree, the first degree being set for the first object region, the second degree being set for the second object region;
generating output image data by performing an unsharp masking process on the input image by using the mask image, the unsharp masking process being performed so as to adjust sharpness of the input image; and
sending the output image data to a printing unit.

2. The image processing device according to claim 1, wherein in the unsharp masking process, sharpness of an image in an object region represented using bitmap data is more enhanced than sharpness of an image in an object region represented without using the bitmap data.

3. The image processing device according to claim 1, wherein the mask image has a plurality of partial regions corresponding to the plurality of object regions, respectively, each of the plurality of partial regions being individually generated by smoothing an image in a corresponding object region at a smoothing strength based on a sharpness adjustment degree relevant to the corresponding object region.

4. The image processing device according to claim 1, wherein the mask image has a plurality of partial regions corresponding to the plurality of object regions,
wherein each of the plurality of partial regions is generated upon setting a unique sharpness adjustment degree to a corresponding one of the plurality of object regions, and the plurality of partial regions is applied en bloc to the input image data.

5. The image processing device according to claim 1, wherein in the unsharp masking process an unsharped mask is calculated using the mask image and the calculated unsharped mask is used to adjust the sharpness of the input image,
wherein the processor is further configured to perform classifying each of the plurality of object regions into one of the first object region and the second object region, the first object region being represented using bitmap data, the second object region being represented without using bitmap data,
wherein the generating the mask image comprises:
generating a first partial mask image for an object region classified into the first object region by smoothing an image in the object region classified into the first object region at a first smoothing strength, the first partial mask image being used when calculating the unsharped mask; and
generating a second partial mask image for an object region classified into the second object region, the second partial mask image being generated as a same image as an image in the object region classified into the second object region or being generated by smoothing the image in the object region classified into the second object region at a second smoothing strength weaker than the first smoothing strength, the second partial mask image being used when calculating the unsharped mask.

6. The image processing device according to claim 5, wherein the generating the mask image comprises:
identifying a first processing portion and a second processing portion from the object region classified into the first object region by analyzing the object region classified into the first object region;
generating a first partial mask portion corresponding to the first processing portion by smoothing an image in the first processing portion at a third smoothing strength, the first partial mask portion being used when calculating the unsharped mask; and
generating a second partial mask portion corresponding to the second processing portion, the second mask portion being generated as a same image in the second processing portion or being generated by smoothing the image in the second processing portion at a fourth smoothing strength weaker than the third smoothing strength, the second partial mask image being used when calculating the unsharped mask.

7. The image processing device according to claim 5, wherein the input image data includes a plurality of commands to draw the plurality of objects in the plurality of object regions,
wherein the processor is configured to perform classifying each of the plurality of object regions into one of the first object region and the second object region on a basis of a command to draw an object in the each of the plurality of object regions.

8. The image processing device according to claim 7, wherein the identifying includes performing a specific identification process in which a target object region drawn by at least one command of the plurality of commands is identified,
wherein the generating the mask image includes performing a specific generation process, the processor is further configured to perform in the specific generation process:
generating a target raster data representing an image in the target object region; and
generating a target mask image for the target object region,
wherein after the specific identification process and the specific generation process are performed for the target object region, another specific identification process is performed to identify another target object region and another specific generation process is performed to generate a target mask for the another target object region.

9. The image processing device according to claim 7, wherein the generating the mask image includes generating an input raster data representing the input image by a rasterizing operation using the plurality of commands,
wherein the mask image is generated by smoothing at least a portion in the object region classified into the first object region in the input raster data.

10. The image processing device according to claim 1, wherein the mask image is used when calculating an unsharped mask applied on the input image in the unsharp masking process.

11. A non-transitory computer readable storage medium storing a set of program instructions installed on and executed by a computer, the program instructions comprising:
acquiring input image data representing an input image having a plurality of objects, the plurality of objects including a first object and a second object different from the first object;
identifying a plurality of object regions in the input image, the plurality of object regions representing respectively the plurality of objects, the plurality of object regions including a first object region and a second object region, the first object region representing the first object, the second object region representing the second object;
generating a mask image using sharpness adjustment degrees that are set for the plurality of object regions respectively, the sharpness adjustment degrees including a first degree and a second degree different from the first degree, the first degree being set for the first object region, the second degree being set for the second object region;
generating output image data by performing an unsharp masking process on the input image by using the mask image, the unsharp masking process being performed so as to adjust sharpness of the input image; and
sending the output image data to a printing unit.

12. The non-transitory computer readable storage medium according to claim 11, wherein in the unsharp masking process, sharpness of an image in an object region represented using bitmap data is more enhanced than sharpness of an image in an object region represented without using the bitmap data.

13. The non-transitory computer readable storage medium according to claim 11, wherein the mask image has a plurality of partial regions corresponding to the plurality of object regions, respectively, each of the plurality of partial regions being individually generated by smoothing an image in a corresponding object region at a smoothing strength based on a sharpness adjustment degree relevant to the corresponding object region.

14. The non-transitory computer readable storage medium according to claim 11, wherein the mask image has a plurality of partial regions corresponding to the plurality of object regions,
wherein each of the plurality of partial regions is generated upon setting a unique sharpness adjustment degree to a corresponding one of the plurality of object regions, and the plurality of partial regions is applied en bloc to the input image data.

15. The non-transitory computer readable storage medium according to claim 11, wherein in the unsharp masking process an unsharped mask is calculated using the mask image and the calculated unsharped mask is used to adjust the sharpness of the input image,
wherein the processor is further configured to perform classifying each of the plurality of object regions into one of the first object region and second object region, the first object region being represented using bitmap data, the second object region being represented without using bitmap data,
wherein the generating the mask image comprises:
generating a first partial mask image for an object region classified into the first object region by smoothing an image in the object region classified into the first object region at a first smoothing strength, the first partial mask image being used when calculating the unsharped mask; and
generating a second partial mask image for an object region classified into the second object region, the second partial mask image being generated as a same image as an image in the object region classified into the second object region or being generated by smoothing the image in the object region classified into the second object region at a second smoothing strength weaker than the first smoothing strength, the second partial mask image being used when calculating the unsharped mask.

* * * * *